United States Patent [19]

Orendorf et al.

[11] Patent Number: 4,795,522
[45] Date of Patent: Jan. 3, 1989

[54] BEAD FILLER APPLICATOR

[75] Inventors: Daniel C. Orendorf, Hartville; Andrew R. Green, Doylestown; Robert E. Bossick, Mogadore, all of Ohio

[73] Assignee: The Firestone Tire & Rubber Company, Akron, Ohio

[21] Appl. No.: 718,906

[22] Filed: Apr. 2, 1985

[51] Int. Cl.[4] ............................................. B29D 30/06
[52] U.S. Cl. ..................................... 156/398; 156/136; 156/420; 156/421; 156/447; 156/458; 156/460; 156/494; 156/502; 156/522; 156/544; 226/92; 226/95
[58] Field of Search ............... 156/422, 394.1, 398, 156/136, 123, 460, 229, 544, 417, 421, 446, 475, 477.1, 481, 522, 539, 447, 500, 304.1, 420, 304.2, 458, 494, 495, 502, 516, 517; 226/92, 93, 95

[56] References Cited

U.S. PATENT DOCUMENTS

| | | | |
|---|---|---|---|
| 3,787,263 | 1/1974 | Yonekawa et al. | 156/136 |
| 3,909,338 | 9/1975 | Leblond et al. | 156/422 |
| 4,226,663 | 10/1980 | Pirovano et al. | 156/422 |
| 4,298,421 | 11/1981 | Pirovano | 156/460 |
| 4,354,892 | 10/1982 | Tarantola et al. | 156/398 |
| 4,398,988 | 8/1983 | Mullender | 226/95 X |
| 4,410,389 | 10/1983 | Cole et al. | 156/398 |

Primary Examiner—David Simmons
Assistant Examiner—Thomas Bokan
Attorney, Agent, or Firm—Ronald Brietkrenz

[57] ABSTRACT

An apparatus and method for applying a bead filler material to a bead wherein the bead filler material may be applied to the bead at an offset position to compensate for the stretching of the filler material as it is applied to the bead to afford a proper splice of the leading and trailing ends of the bead filler material.

10 Claims, 11 Drawing Sheets

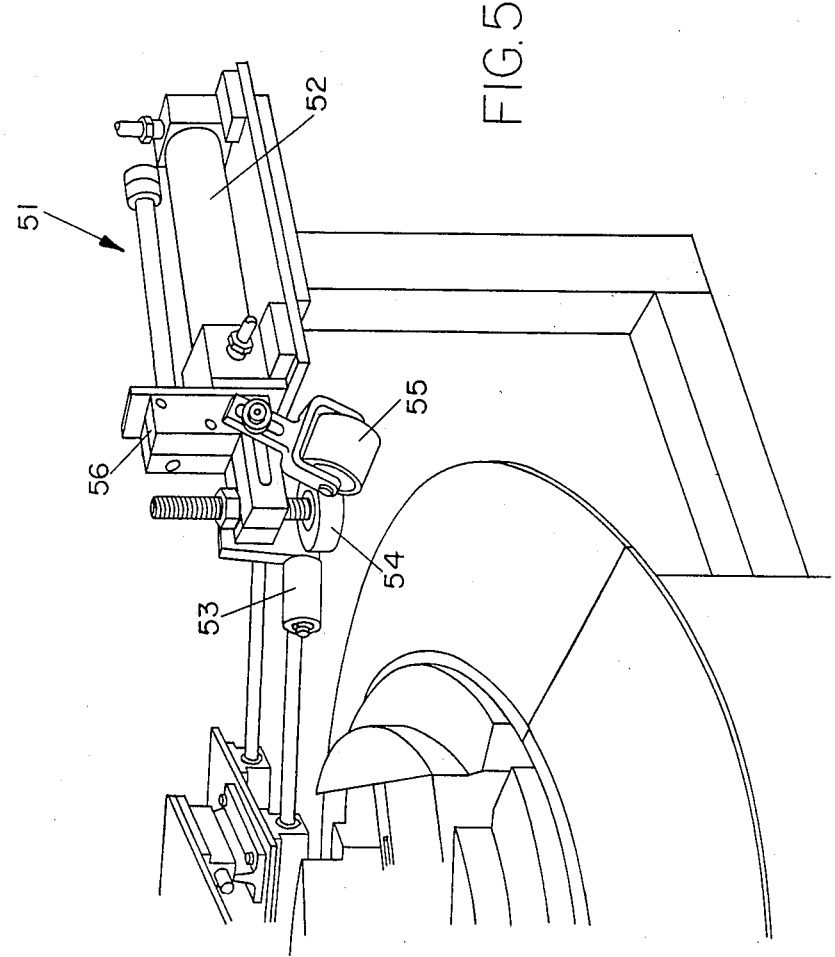

BEAD FILLER APPLICATOR

BACKGROUND OF THE INVENTION

1. Field of the Invention

This invention relates to a means for fabricating a bead assembly utilized in the construction of a tire. Specifically, the instant invention relates to a means and method for applying a filler to a bead whereby the filler is wrapped about the outer circumference of the bead and the ends of the filler are joined to completely encompass the bead. The instant invention employs an angled orientation of the end of the filler with respect to the radius of the bead in combination with offset application of the leading and trailing ends of the filler in order to facilitate the joining of the leading and trailing ends of the filler.

2. Description of the Prior Art

Apparatus for applying a filler to a bead is well known in the art as disclosed by U.S. Pat. No. 3,909,338 to Leblond et al. which discloses an apparatus and method for applying an elastomeric bead filler to a bead ring. The apparatus of Leblond has a pully for supporting a bead ring and a unit for advancing the filler strip to the outer periphery of the bead ring. Other units are provided for cutting the strip to a length corresponding to the circumference of the periphery of the bead ring, and for applying the strip to the periphery of the bead ring. U.S. Pat. Nos. 4,226,663 and 4,298,421 to Pirovano et al. discloses a device for automatically loading a bead core to an apparatus which associates an elastomeric filler with the bead core and for unloading the bead core with the filler. The device employs two jaws for loading the bead core and means for controlling the opening of the jaws. A mechanism is employed for grasping each end of the filler in order to butt splice the ends of the filler about the bead.

U.S. Pat. No. 3,787,263 to Yonekawa et al. relates to a method and apparatus for automatically sticking an apex rubber strip on bead rings for use in pneumatic tires whereby a number of bead rings may be fed to and disposed on a pair of driving rollers, one by one, and a continuous apex rubber strip may be fed to the outer periphery of each ring. Successive steps of sticking the forward end of the apex rubber strip on the outer periphery of each bead ring, rotating the driving rollers, detecting the arrival of the forward end of the apex strip stuck on the outer periphery of each bead ring at its final position around the bead ring, obliquely cutting the rear end of one turn of the apex rubber strip, restarting the rotation of the driving rollers and sticking the rear end of the apex rubber strip thus cut on the bead ring, and replacing the bead ring with a new bead ring, are performed automatically.

The prior art also includes U.S. Patent No. 4,354,892 to Tarantola et al. which discloses an apparatus provided with means suitable for stretching a filler when it is pulled into rotation with a bead core on the drum to stiffen the filler and resist bending, and therefore maintain the filler substantially in the drum midline. The apparatus of Tarantola et al. is further provided with means for discharging the bead core/filler assembly in a plane unchanged with respect to that determined by the stretching needs in order to permit the collection of various filler bead core assemblies one after another. A pair of fingers are utilized to splice the ends of the filler.

U S. Pat. No. 4,410,389 in the name of Cole et al. discloses a continuously operating machine for forming filler bead core assemblies comprising a filler applicator where the bead core and an endless length of filler material in cylindrical form are disposed adjacent to one another, the filler material subsequently being rotated outwardly to lie on the outside of the bead core.

The prior art devices are generally not adapted for the application of wide filler members to a bead without employing relatively complex application mechanism, especially for joining the ends of the bead filler. The instant invention solves this problem by providing a relatively simple mechanism which is capable of applying wide bead filler members to a bead wherein a tension gradiant is employed during the application of the filler member in combination with an offset application of the leading and trailing ends of the filler in order to provide application of the relatively wide filler to the bead wherein the application process is automatically performed by the relatively simple applicator mechanism.

SUMMARY OF THE INVENTION

The present invention relates to a means and method for applying a filler to a bead and more particularly to an applicator mechanism adapted to apply a leading end of a continuous length of wide filler to a bead at an offset location and then causing the filler to wrap around the bead wherein the leading end of the filler is fixedly retained by a vacuum means in order to cause a tension gradiant within the filler whereby the trailing end of the filler may be severed and the trailing end of the filler applied to the bead at an offset location in order to provide an acceptable splice between the leading and trailing ends of the filler.

BRIEF DESCRIPTION OF THE DRAWING

FIG. 5 is a perspective view of the stitching mechanism employed by the instant invention.

DESCRIPTION OF AN EXEMPLARY EMBODIMENT

Figure 1:
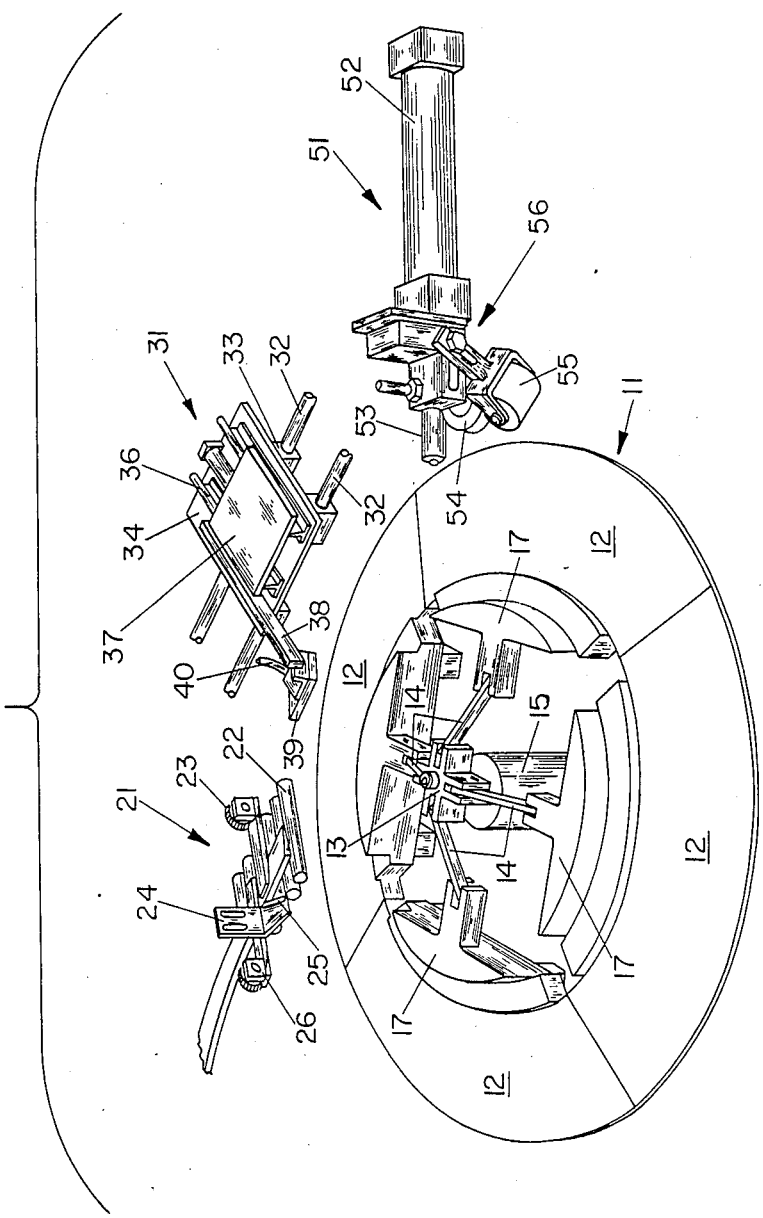
FIG. 1 is a simplified perspective view of the applicator means of the instant invention.

Referring now to FIG. 1 of the drawings, there is shown a schematic representation of the instant invention. Bead chuck 11 is employed to retain a bead therein by clamping the inner diameter of the bead. The bead chuck 11 is comprised of four radially slidable chuck members 12 which are adapted to be displaced in a radial direction towards and away from the center of the bead chuck 11. The chuck members 12 are linked to center connector 13 by means of links 14. The center connector 13 is fixedly attached to the rod end of fluid cylinder 15 which may be selectively actuated to cause the center connector 13 to be vertically displaced with respect to the bead chuck 11. It may be readily seen that a vertical displacement of the center connector 13 utilizing fluid cylinder 15 will cause the radially slidable chuck members 12 to be displaced inwardly or outwardly in response to the displacement of the center connector 13.

Associated with each of the chuck members 12 is a corresponding bead retaining lip 17 which is adapted to grasp the inner surface of a bead placed over the chuck members 12 when the chuck members 12 are displaced in a radially outward direction in response to a displacement of the fluid cylinder 15. The bead chuck 11 is adapted to be rotated about its longitudinal axis in order to facilitate the application of a filler to a bead as more fully disclosed below.

It may thus be appreciated that there is disclosed a bead chuck 11 which is readily adapted to secure a bead thereto by causing the bead retaining lips of the chuck members 12 to engage the inner surface of the beads. The beads so secured can then be rotated in order to facilitate the application of a filler to the bead.

The knife assembly 21 is employed to sever a portion of the filler from a continuous length provided to the knife assembly 21. The knife assembly 21 is comprised of a series of rollers 22 which are used to transport the filler material. Disposed above the rollers 22 are arm members 23 and 26. The arm members 23 and 26 are selectively actuated by means not shown in FIG. 1 to either a position allowing the filler to be transported along the rollers 22 or a position proximate the rollers 22 as shown in FIG. 1 wherein the arm members 23 and 26 retain the filler between the arm members 23 and 26 and the rollers 22 to facilitate the cutting of the filler material.

A knife means 24 is employed to sever the filler material as it is being held by the arm members 23 and 26 and rollers 22. The knife means 24 is adapted to be linearly displaced by means more fully disclosed below across the path of the filler material to cause the filler material to thereby be severed. It should be noted that the knife means 24 has a cutting edge 25 which is angled with respect to the longitudinal axis of the filler material to thereby cause a beveled cut of the filler material for reasons which will be more fully discussed below.

There is thus provided a knife assembly 21 which is adapted to cut the filler material such that the end of the filler material is beveled in order to co-act with the other end of the filler material in order to provide a smooth splice of the filler material when it is applied to the bead.

The applicator assembly 31 is employed to transport the filler from the knife assembly 21 to the bead chuck 11. The applicator assembly 31 includes linear ways 32 which co-act with linear bearings 33 to provide a means for linearly displacing platform 34. Disposed on the platform 34 are linear ways 36 which are adapted to co-act with linear bearings (not shown) upon which is supported transport frame 37. Affixed to the transport frame 37 is manifold support 38 having disposed on the end thereof manifold 39. The manifold 39 is in operative connection with a vacuum source via vacuum line 40.

It can thus be seen that there is provided a means for moving the manifold 39 in two orthogonal directions. In the exemplary embodiment, the manifold 39 may be positioned proximate to the rollers 22 of knife assembly 21 and a vacuum applied to the manifold in order to cause one end of the filler to be temporarily affixed to the manifold 39 due to the vacuum created within the manifold. The end of the filler can then be transported from the rollers 22 to the bead chuck 11 and applied to said bead chuck 11 in a manner more fully disclosed below.

Disposed proximate to the applicator assembly 31 is stitcher assembly 51. The stitcher assembly 51 is comprised of a pneumatic cylinder 52 which has the barrel end thereof fixedly attached to the base of the bead applicator. Affixed to the rod end of the pneumatic cylinder 52 is stitcher mounting means 56 which is adapted to be positioned proximate to and away from said bead chuck 11 by means of the pneumatic cylinder 52.

The stitcher mounting means 56 is comprised of an upper guide roll 53, a radial stitcher roll 54 and an angled stitcher roll 55. The stitcher mounting means 56 is employed to stitch the ends of the filler together after the filler has been applied to the bead chuck 11 in order to form an integral assembly with the bead and the filler and also to cause the filler to firmly adhere to the bead.

Figure 2:
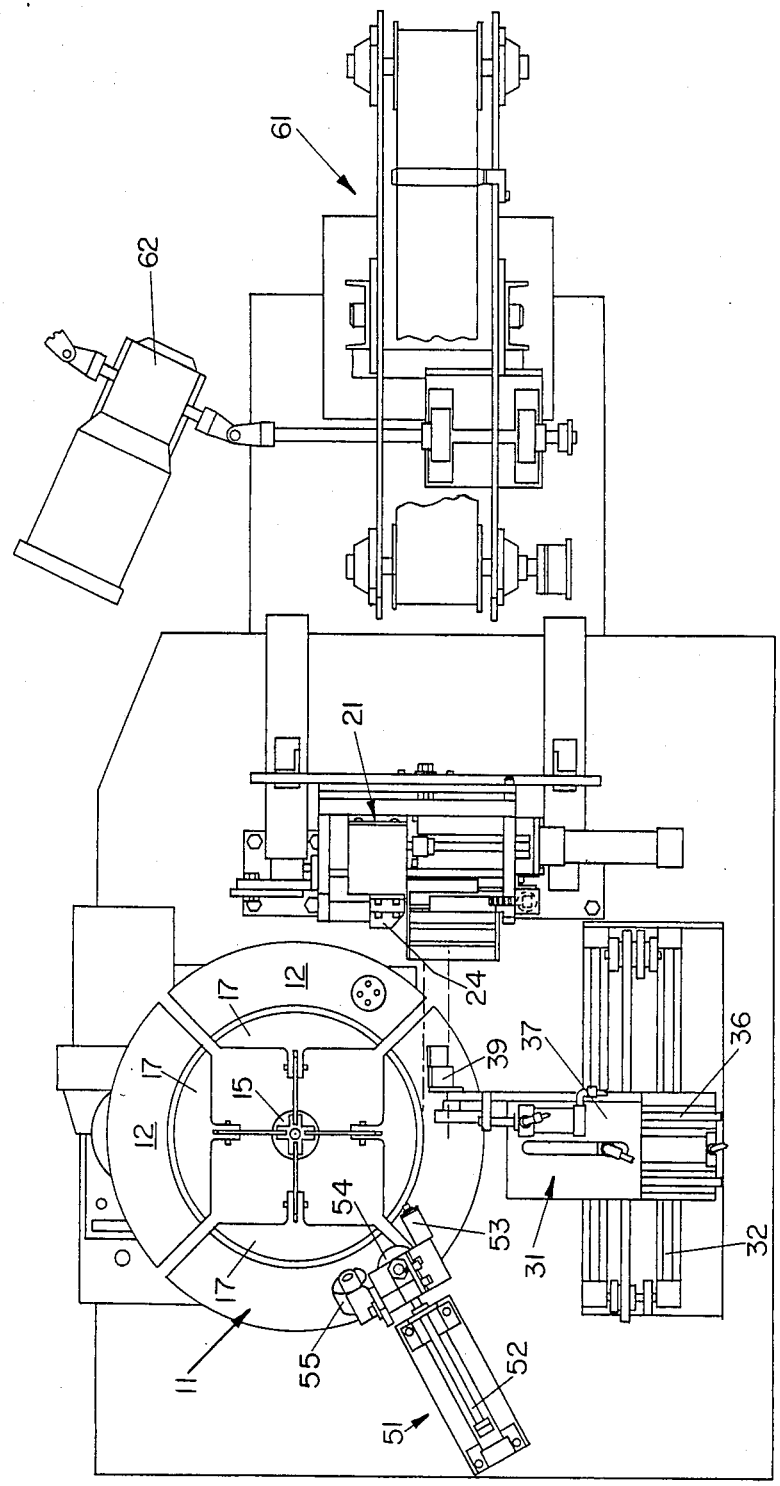
FIG. 2 is a plan view of the applicator showing the details of construction thereof.

Referring now to FIG. 2 of the drawings, there are disclosed further details of the instant invention. Disposed about the bead chuck 11 are the stitcher assembly 51, applicator assembly 31 and knife assembly 21. Disposed proximate to the knife assembly 21 is feed conveyor assembly 61. The feed conveyor assembly 61 is adapted to receive a continuous length of filler material from a continuous extruder, which extruder is well known in the art. The feed conveyor assembly 61 is adapted to transport the bead filler from the extruder to the knife assembly 21 where it is severed for subsequent application to the bead chuck 11. Both the extruder (not shown) and the feed conveyor assembly 61 are of a structure well known in the art.

Figure 3:
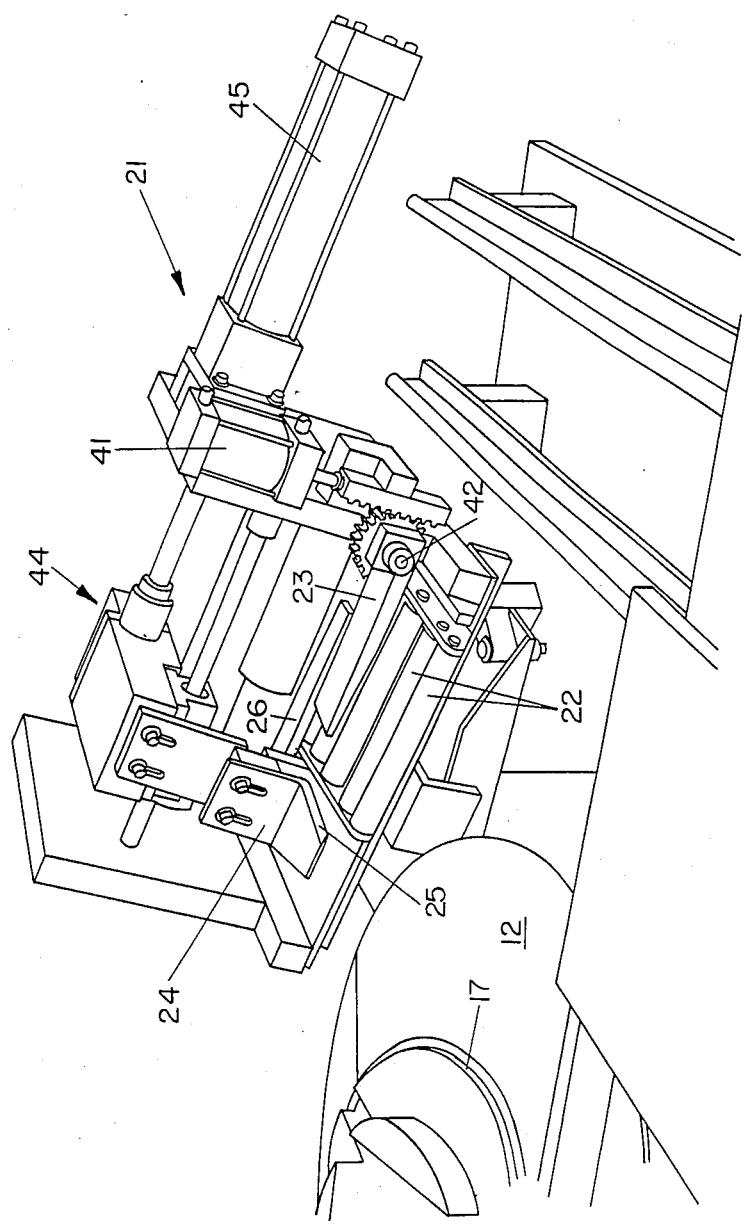
FIG. 3 is a perspective view of the cutting mechanism employed by the instant invention.

The filler is transported from the feed conveyor assembly 61 to the knife assembly 21. The knife assembly is shown in more detail in FIG. 3 of the drawings. The knife assembly 21 includes arm member 23 actuated by pneumatic cylinder 41 which in turn actuates a rack mechanism which causes the arm member 23 to be rotated about its pivot 42 upon actuation of the pneumatic cylinder 41. There is a corresponding arm member 26 mounted opposite to the arm member 23. The arm member 26 is also actuated by a pneumatic cylinder (not shown) which employs a linkage mechanism wherein the arm member 26 may be similarly rotated about a pivot point in order to allow the arm member 26 to be displaced toward the rollers 22.

Disposed above the arm members 23 and 26 are knife means 24 having cutting edge 25 thereon. The knife means 24 is caused to move parallel to the axis of the rollers 22 by means of slide assembly 44 operatively connected to pneumatic cylinder 45. The pneumatic cylinder can thus selectively be actuated to cause the slide assembly 44 to be displaced in a direction parallel to the axis of the rollers 22 in order to cause the knife means 24 and its associated cutting edge 25 to traverse the length of the rollers 22 in order to sever a portion of filler material from the continuous length provided by the extruding means as more fully disclosed below.

It may thus be appreciated that there is provided a transport means utilizing rollers 22 to allow the filler material to be transported with respect to the knife assembly 21 wherein the filler material may be severed by the knife assembly 21 upon actuation of the arm members 23 and 26 in a downward position against the filler member disposed on the rollers 22 supporting the bottom of the filler material wherein the filler material is securely retained by the arm members 23 and 26 in order to facilitate cutting of the filler member by knife means 24 which is caused to traverse the width of the filler member by actuation of the pneumatic cylinder 45 thereby causing slide assembly 44 to transport the knife means across the filler member to thereby sever a portion of the filler member from the continuous lenth provided by the extruding means.

It should be noted that the cutting edge 25 of the knife means 24 is slightly angled with respect to the longitudinal axis of the filler material in order to provide a tapered edge of the end of the filler material which is employed as discussed below in more detail.

Figure 4:
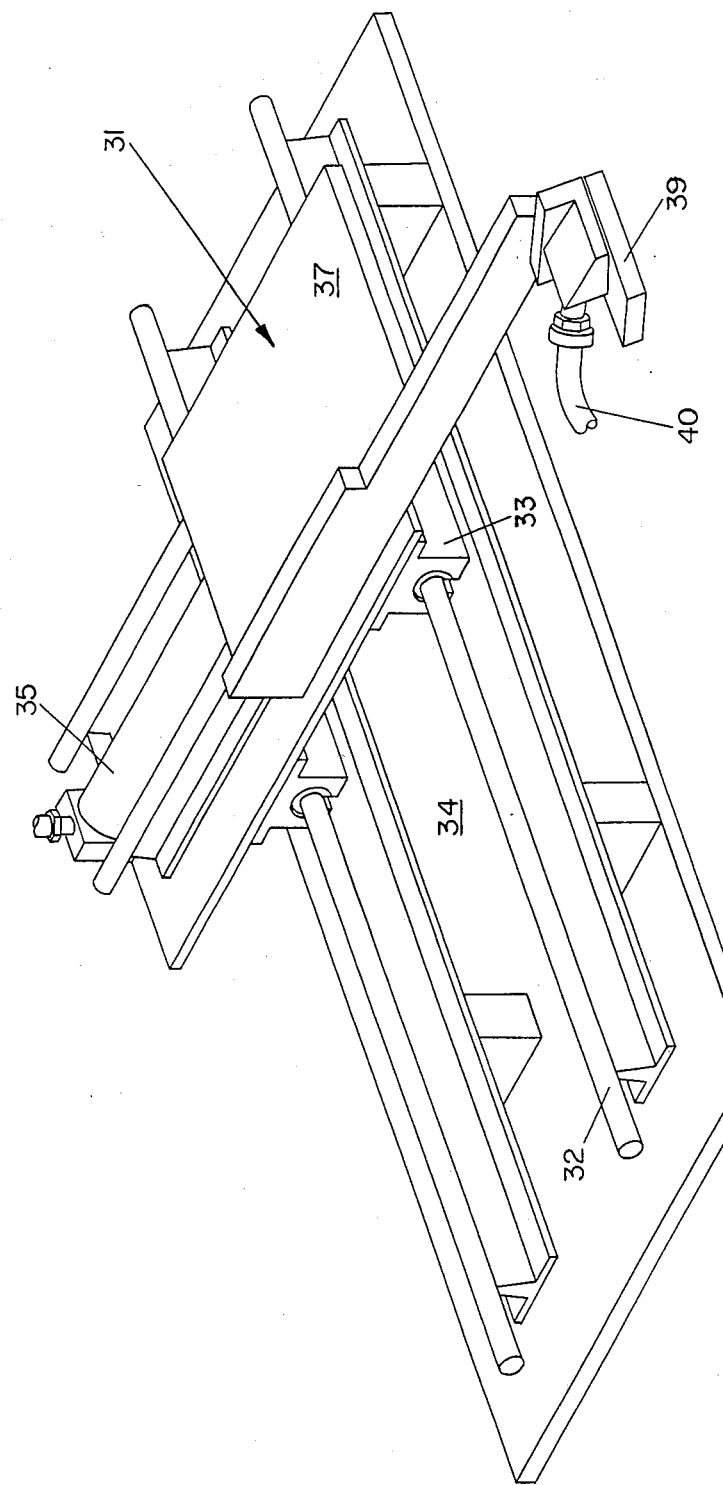
FIG. 4 is a perspective view of the transport mechanism employed by the instant invention.

Referring now to FIG. 4 of the drawings there are shown more details of construction of the applicator assembly 31 which is employed by the instant invention to transport the filler material from the knife assembly to the bead chuck 11. The applicator assembly 31 is comprised of the manifold 39 in communication with a vacuum source via line 40 wherein the manifold 39 is adapted to pick up the end of the filler material and apply it to the bead chuck 11. It should be noted that the manifold 39 is mounted at an angled orientation corresponding to the angled orientation of the filler material and its relationship with the bead chuck 11.

The manifold 39 is fixedly attached to the transport frame 37 which is adapted to be disposed relative to the platform 34 upon actuation of pneumatic cylinder 35 which causes the transport frame 37 to be displaced with respect to the platform 34. Similarly, the transport frame 37 may be similarly displaced in an orthagonal direction by means of linear ways 32 co-acting with linear bearings 33. The transport frame 37 may be transported upon actuation of a pneumatic cylinder (not shown) in a direction orthagonal to the displacement of the manifold 39 provided by the pneumatic cylinder 35.

It can thus be appreciated that there is provided means for displacing the manifold 39 in two orthogonal directions and additionally for providing a vacuum to the manifold 39 to allow the manifold to transport the end of the filler material from the knife assembly 21 to the bead chuck 11.

Further details of construction of the stitcher assembly 51 are disclosed in FIG. 5 of the drawings. The stitcher assembly 51 is comprised of a pneumatic cylinder 52 having affixed to the rod end thereof stitcher mounting means 56 which is adapted to have upper guide roll 53, radial stitching roll 54 and angled stitching roll 55 affixed thereto. After the leading edge of the filler has been applied to the bead chuck 11 and passes stitcher assembly 51, the pneumatic cylinder 52 is energized to cause the stitcher mounting means 56 to be displaced towards the bead chuck 11 causing upper guide roll 53, radial stitcher roll 54 and angled stitcher roll 55 to engage the filler on the bead. After the trailing end of the filler has been applied to the bead, the stitcher assembly 51 further causes the ends of the filler to be firmly stitched together.

Figure 7:
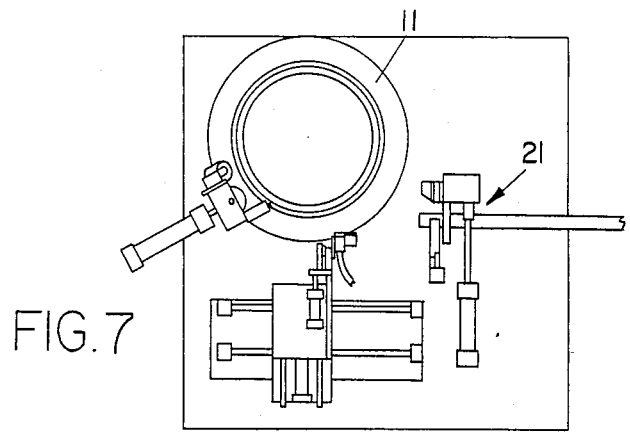

Referring now to FIGS. 7 through 14 of the drawings, there is disclosed a schematic representation of the instant invention showing the operation of the instant invention. FIG. 7 shows the bead chuck 11 in its retracted position ready for application of a bead thereto.

The arm members of the knife assembly 21 are in their downward position retaining the filler material.

Figure 8:
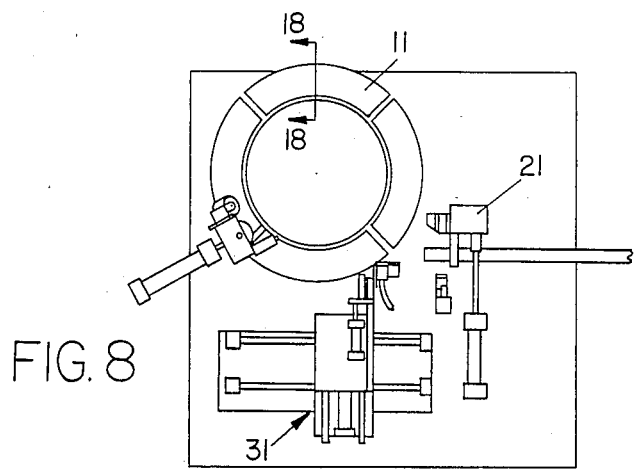

The next sequence in the operation of the instant invention is disclosed in FIG. 8 of the drawings wherein the bead chuck 11 has been expanded to cause a bead 10 which was previously placed on the bead chuck 11 to be firmly retained thereby for application of the filler thereto. In addition, the applicator assembly 31 has been caused to be moved towards the knife assembly 21 in order to allow the applicator assembly 31 to pick up the end of the filler material at the knife assembly 21. In addition, the arm member 23 has been displaced away from the filler material in order to allow the applicator assembly to move the end of the filler material from the knife assembly to the bead chuck 11.

Figure 9:
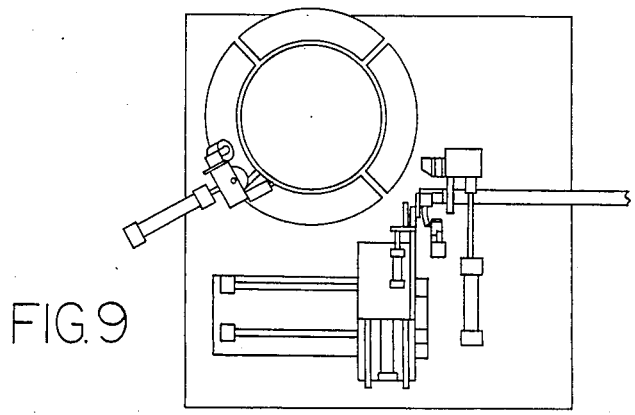

In FIG. 9 there is disclosed the next sequence of operations wherein the manifold 39 of the applicator assembly 31 is caused to grasp the end of the filler material by porting a vacuum to the manifold 39 via vacuum line 40 thereby causing the end of the filler material to be retained by the manifold 39. The arm member 26 is then raised.

Figure 10:
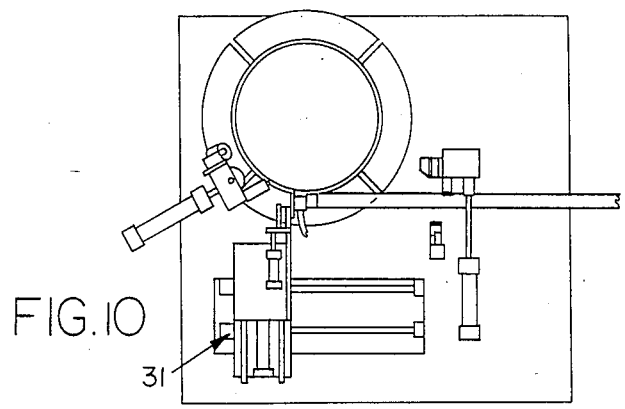

The next sequence of the operation, as shown in FIG. 10 of the drawings, is the transport of the end of the filler material by the applicator assembly 31. The applicator assembly 31 causes the end of the filler material to be affixed to the bead chuck 11 at a position proximate to an orifice in the bead chuck 11, which orifice can be selectively in communication with a vacuum source to assist the transfer of the filler material from the manifold 39 to the bead chuck 11. In addition, the bead chuck 11 causes the filler material to be firmly biased against the bead retained by the bead chuck 11 in order to cause further adherence of the filler material to the bead chuck 11. In the exemplary embodiment, the end of the filler material is applied at a position offset from the radial centerline of the bead chuck 11. The radial chuck centerline is defined as the line passing through the chuck center and which is perpendicular to the longitudinal axis of the unapplied filler.

Figure 11:
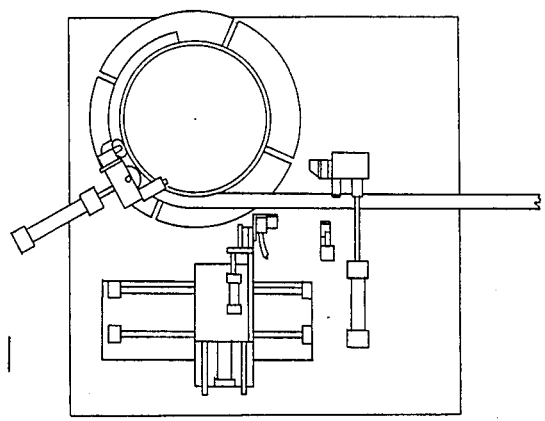

After the end of the filler material has been applied to the bead chuck 11, the applicator assembly, as shown in FIG. 11 of the drawings is withdrawn and the stitcher assembly is caused to be actuated causing the upper, radial and angled stitcher rolls to engage the bead filler material causing the filler material to be biased against the bead retained on the bead chuck 11. Simultaneously, the bead chuck 11 is rotated to cause the filler member to be rotated about the bead chuck 11 and hence the bead retained by the bead chuck 11.

Figure 12:
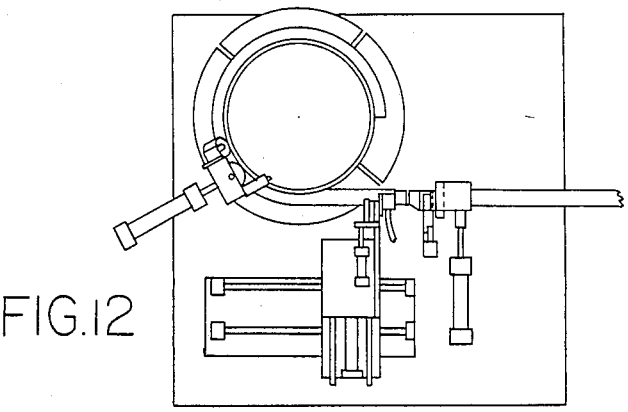
Figure 15:
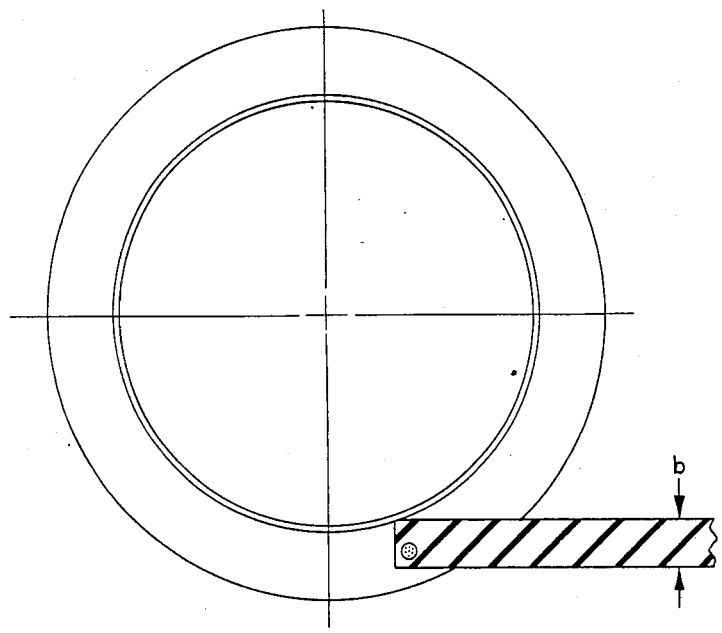
FIGS. 15 through 17 are schematic representations disclosing the relationship between the filler and the bead as it is being applied to the bead.

The next sequence of operations is shown in FIG. 12 of the drawings wherein the arm members 23 and 26 of the knife assembly 21 has been actuated to firmly retain the bead filler therebetween. Simultaneously the applicator assembly 31 has been caused to move the manifold 39 proximate to the end of the severed portion of filler material, wherein the manifold 39 retains the filler material while it is being cut. The knife assembly 21 via pneumatic cylinder 45 is then actuated in order to cause the knife means 24 to sever the continuous length of filler material.

Figure 13:
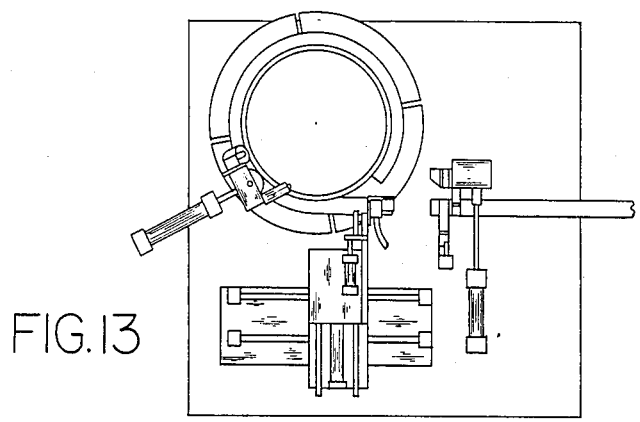
FIGS. 7 through 14 are schematic representations disclosing the operating sequence of the instant invention.
Figure 14:
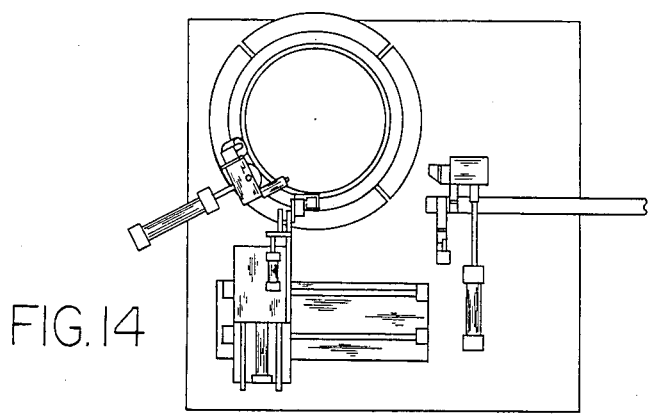

The next sequence of operation, as shown in FIG. 13 of the drawings, shows the applicator assembly 31 transporting the trailing end of the filler material towards the bead chuck 11 as it is being rotated thus causing the filler material to be wrapped around the bead retained on the bead chuck 11.

The final sequence of operations shows the applicator assembly 31 applying the end of the filler material to the bead retained on the bead chuck 11. After the trailing end of the filler material has been applied to the bead and into abutting relationship with the leading end of the filler to form an aligned joint the bead chuck 11 is rotated in order to pass the splice or aligned joint as shown in FIGS. 10-14 of the drawings past the stitcher assembly 51 to assure that the filler material has been stitched to the bead retained in the bead chuck 11.

It will be appreciated by one skilled in the art that the instant invention is particularly adapted for the fully automated application of wide filler members to beads. The application of a wide filler member to a bead presents problems not associated with the application of narrow filler members to beads since there is an appreciable width of filler member that must be transported and applied to the bead member and the application of the wide filler member about the bead results in a considerable amount of distortion of the filler member due to the difference in the inner circumference of the filler member and the outer circumference of the filler member after it has been wrapped around a bead.

Figure 6:
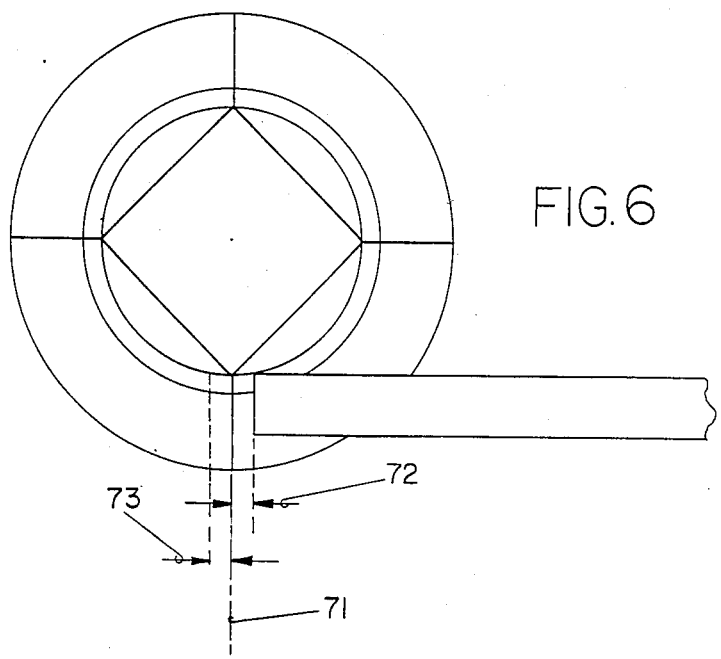
FIG. 6 is a simplified plan view of the bead clamp employed by the instant invention disclosing the offset position of the application of the filler.

As the wide rubber filler member is applied to the bead, tension is developed in the filler member due to the stretching of the filler member as it is wrapped about the bead. This stretching of the filler member is more pronounced in wide filler members due to the much larger difference in the inner and outer circumference of the filler member after it has been wrapped around the bead. The maximum tension develops at the outermost edge of the filler member since the most stretching is required at the outer edge. The wider the rubber filler member, the more tension that is developed in the filler due to the greater difference in the inner and outer circumference of the filler. The presence of this tension makes it more difficult to splice the leading and trailing edges of the filler member due to the distortions in the edges of the filler member caused by this tension. The instant invention overcomes this problem by applying the leading edge of the rubber filler in a location that is offset 72 from the radial chuck centerline 71 as disclosed in FIG. 6 of the drawings. Optionally the trailing edge of the rubber filler is also applied at a location 73 offset from the radial centerline of the bead chuck in the other direction.

Theoretically if there were no slippage between the bead filler and the building chuck vacuum port, the leading and trailing edges of the filler material could be applied on the bead chuck centerline and produce a good splice. However, due to the tensions developed within the filler member as it is being wrapped around the bead wire, the bead filler slowly slips with respect to the vacuum port and the leading edge of the filler material changes its angular orientation with respect to the bead retaining lip (See FIG. 16). Therefore the filler must be offset at the leading edge and optionally at the trailing edge to compensate for this slippage in order to produce an acceptable splice.

Figure 16:
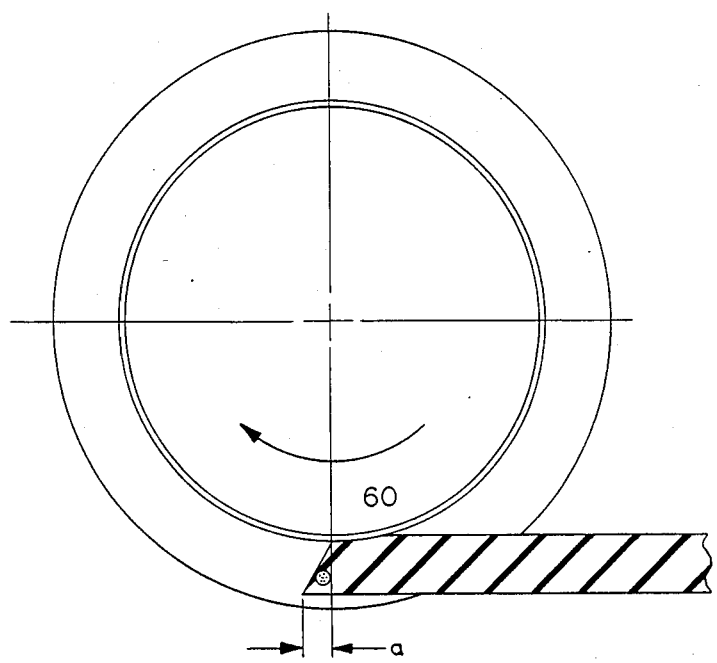
Figure 17:
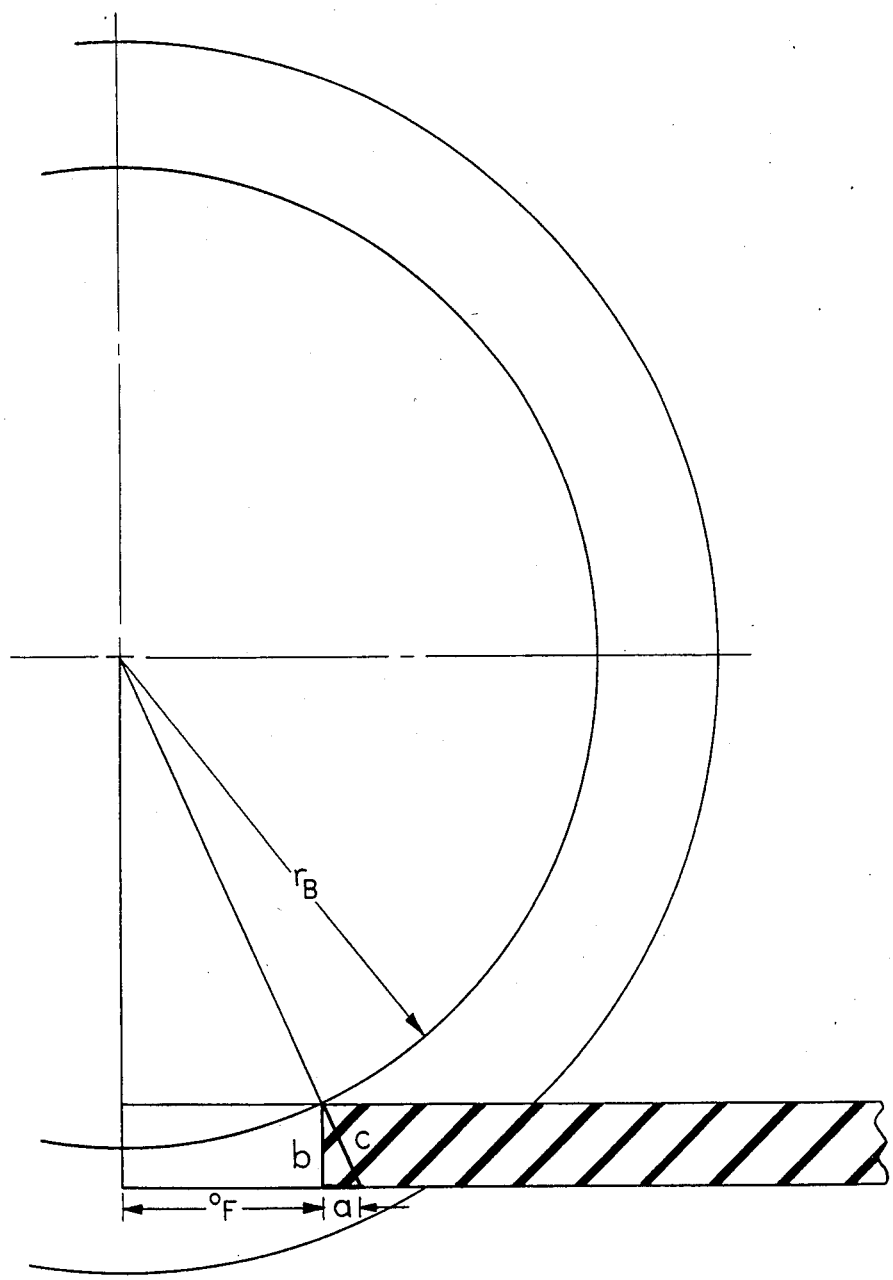

Referring now to FIGS. 16 and 17, there is more fully disclosed the relationship discussed above with respect to the offset application of the leading edge of the filler material to the bead in a location proximate to the vacuum port 61 in order to maximize the retention of the bead filler member to the bead chuck. It can be readily appreciated that as the filler member is wrapped about the bead chuck 11, the outer edge of the filler material must be stretched in order to compensate for the greater circumference of the outer edge of the filler material as it is wrapped about the bead chuck 11 in comparison to the inner circumference of the filler material.

The filler material is held in place at the point of application to the bead chuck 11 by the adhesion to the bead wire and at the bottom by the vacuum port 61. As the inner edge at the filler passes through the chuck centerline (FIG. 16) the outermost circumference is greater by a dimension a as compared to placing the leading edge on the chuck centerline 60. This dimension a is the key to making the edge match for the splices. This diemsnion can be mathematically shown as follows where:

a = advantage length (length of filler "gained" at chuck centerline)
b = bead filler width
$O_f$ = offset length (from building chuck centerline to edge of bead filler)
$r_B$ = radius of bead (outside diameter)

comparing similar triangles from FIG. 17.

(1) $\dfrac{a}{O_f + a} = \dfrac{c}{r_B + c}$  substituting for c (2) $a(r_B + c) = c(O_f + a)$ (3) $ar_B + ac = cO_f + ca$ (4) $ar_B = cO_f$ solving for a:

(5) $a = \dfrac{cO_f}{r_B}$ using the definition for a right triangle:

(6) $c^2 = a^2 + b^2$ (7) $c = \sqrt{a^2 + b^2}$ (8) $a = \dfrac{O_f \sqrt{a^2 + b^2}}{r_B}$ (9) $ar_B = O_f \sqrt{a^2 + b^2}$

(10) $a^2 r_B^2 = O_f^2(a^2 + b^2)$

(11) $a^2 r_B^2 = O_f^2 a^2 + O_f^2 b^2$

(12) $a^2 r_B^2 - O_f^2 a^2 = O_f^2 b^2$

(13) $a^2(r_B^2 - O_f^2) = O_f^2 b^2$

(14) $a^2 = \dfrac{O_f^2 b^2}{r_B^2 - O_f^2}$

(15) $a = \dfrac{\sqrt{O_f^2 b^2}}{r_B^2 - O_f^2}$

As the chuck rotates (FIG. 16) the drawing shows the advantage length a afforded to the instant invention. This same principle can be applied to the trailing edge and would result in an advantage length in the opposite direction. This method of applying the trailing edge is used when required, depending on bead diameter, bead filler width, etc.

Figure 18:
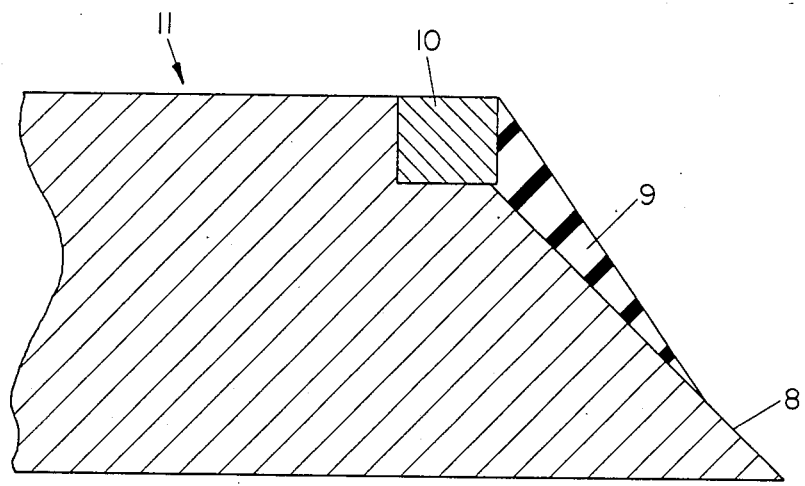
FIG. 18 is a cross sectional view taken along the line 18—18 of FIG. 8.

FIG. 18 is a cross sectional view of a portion of the bead chuck 11, a bead 10 mounted on said bead chuck, and the filler 9 affixed to the bead 10. It should be appreciated that the lateral axis at the filler 9 is at an angle with respect to the face of the bead 10 to which it is affixed as opposed to being perpendicular to the face of the bead as is conventional. The angle at which the filler 9 may be applied to the bead 10 may be varied by changing the angle of the chuck face 8.

It may thus be appreciated that there is provided a means for applying a relatively wide bead filler material to a bead disposed on a bead chuck wherein the initial position of the leading edge of the bead filler material is offset from the centerline of the bead chuck in order to compensate for the stretching of the outer edge of the bead filler material that occurs during the application of the filler material about the bead in order to provide a proper splice of the leading end and trailing ends of the bead filler member after it has been applied to the bead. Optionally the trailing end of the bead filler material may similarly be offset in an opposite direction with respect to the leading edge of the bead filler material in order to produce similar compensation for the stretching of the outer edge of the bead filler material in order to afford a proper splice between the leading and trailing edges of the bead filler material.

It will be apparent to those skilled in the art that various modifications and additions may be made to the invention without departing from the essential features thereof, which are intended to be defined and secured by the appended claims.

What is claimed is:

1. An apparatus for applying a filler to a bead comprising:
   (a) bead holding means adapted to hold said bead and to selectively rotate said bead;
   (b) transfer means adapted to grasp a leading end of said filler and place it adjacent said bead at a position offset from the bead holding means radial centerline and to grasp a trailing end of said filler and place it in abutting relationship with the leading end of said filler to form an aligned joint;
   (c) retention means for retaining an outer portion of the leading end of the filler on the bead holding means radially outwardly of the bead to reduce slippage of said outer portion on the bead holding means as the filler is wrapped about the bead; and
   (d) means for pressing the filler to said bead as said filler is wrapped about the bead.

2. The apparatus of claim 1 wherein said transfer means is adapted to affix said filler to said bead wherein the lateral axis of the filler is not perpendicular to the face of the bead to which it is applied.

3. The apparatus of claim 1 wherein said transfer means is comprised of:
   (a) manifold means selectively connectable to a vacuum source;
   (b) linea displacement means for displacing said manifold means in a first direction; and
   (c) linear displacement means for displacing said manifold means in a second direction.

4. The apparatus of claim 3 further comprising cutting means adapted to cut said filler.

5. The apparatus defined in claim 1 in which the retention means is a vacuum port formed in the bead holding means.

6. The apparatus defined in claim 5 in which the filler has inner and outer circumferential edges; in which the leading end terminates in an end edge; and in which the outer portion retained by the vacuum port is located adjacent a corner formed by the junction of the end edge and outer circumferential edge.

7. The apparatus defined in claim 6 in which the leading edge extends in an inwardly angled direction from the outer circumferential edge toward the inner circumferential edge as the end edge of the leading end passes the radial centerline of the bead holding means.

8. The apparatus defined in claim 1 in which the transfer means is a manifold selectively connectable to a vacuum source, and linear displacement means for displacing the manifold in at least two orthagonal directions.

9. In an apparatus for applying a filler to a bead wherein said bead is retained on a chuck and wherein the first end of said filler is applied to said bead the improvement comprising:
   applicator means adapted to apply said first end on said bead at position offset from the chuck radial centerline and to apply a second end of said filler on said bead in abutting relationship with the first end;
   means for affixing an outer end portion of said first end on the chuck to reduce slippage of said first end as the filler is wrapped about the bead;
   means for rotating the chuck while applying the filler thereto; and
   stitching means for affixing the filler to said bead and for pressing together the abutted ends of the filler.

10. An apparatus for applying a filler to a bead comprising:
   (a) bead holding means adapted to hold said bead and to selectively rotate said bead;
   (b) transfer means adapted to grasp a leading end of said filler and place it adjacent the bead at a position offset from the bead holding means radial centerline;
   (c) retention means for retaining an outer portion of the leading end of the filler on the bead holding means radially outwardly of the bead to reduce slippage of said outer portion on the bead holding means as the filler is wrapped about the bead;
   (d) cutting means adapted to cut said filler after the filler is wrapped partially about the bead to form a trailing end;
   (e) said transfer means being adapted to grasp the filler as it is being cut by the cutting means and to place the trailing end adjacent the bead and leading end; and
   (f) roll means for pressing the filler to said bead and for pressing together the leading and trailing ends of said filler.

* * * * *